(12) United States Patent
Kanoh

(10) Patent No.: US 8,360,644 B2
(45) Date of Patent: Jan. 29, 2013

(54) LINEAR MOTION GUIDE UNIT WITH CAGE

(75) Inventor: Shinji Kanoh, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 9 days.

(21) Appl. No.: 13/181,044

(22) Filed: Jul. 12, 2011

(65) Prior Publication Data

US 2012/0014628 A1    Jan. 19, 2012

(30) Foreign Application Priority Data

Jul. 14, 2010    (JP) .................................. 2010-159315

(51) Int. Cl.
*F16C 29/04*    (2006.01)
(52) U.S. Cl. ............................... 384/47; 384/50; 384/51
(58) Field of Classification Search .................... 384/47, 384/50, 51, 57, 18, 49, 462, 470, 523, 572, 384/614, 623
See application file for complete search history.

(56) References Cited

U.S. PATENT DOCUMENTS

| | | | |
|---|---|---|---|
| 4,215,904 A * | 8/1980 | Teramachi | 384/47 |
| 4,697,935 A * | 10/1987 | Yasui | 384/47 |
| 5,427,454 A * | 6/1995 | Tsuboi | 384/47 |
| 6,736,541 B2 * | 5/2004 | Kamimura et al. | 384/47 |
| 6,886,983 B2 * | 5/2005 | Tsuboi et al. | 384/51 |
| 6,971,797 B2 * | 12/2005 | Obara et al. | 384/47 |
| 2003/0108256 A1* | 6/2003 | Kamimura et al. | 384/51 |
| 2007/0201778 A1* | 8/2007 | Kakei | 384/51 |

FOREIGN PATENT DOCUMENTS

| JP | 3950683 B2 | 4/2007 |
|---|---|---|
| JP | 2007-232061 A | 9/2007 |
| JP | 2010-236604 A | 10/2010 |

* cited by examiner

*Primary Examiner* — Phillip A Johnson
(74) *Attorney, Agent, or Firm* — Browdy and Neimark, PLLC

(57) ABSTRACT

A linear motion guide unit in which the smaller pitch between the center-lines of adjacent rollers installed in a cage results in the greater number of the rollers lying in a preselected length of the cage to increase load-carrying capacity. The cage plate has openings for retaining the rollers arranged in the lengthwise direction of the cage plate. Each of the openings has a contour whose major axis lies in a widthwise direction of the cage plate. Bearing lips retain axially opposite end surfaces of the rollers, the bearing lips extending inside from an edge around the opening at locations corresponding with diametrically opposite ends of the major axis. The bearing lips end into wedged bearing edges deformable elastically. The bearing edges have bearing slants that conform to the end surfaces of the roller to bear the roller thereon. The bearing slants are in diametrically symmetric relation to each other.

8 Claims, 10 Drawing Sheets

LINEAR MOTION GUIDE UNIT WITH CAGE

FIELD OF THE INVENTION

The present invention relates generally to a linear motion guide unit of the type hereinafter referred to as "finite linear motion guide units" because of their construction where a pair of lengthwise guideway members are movable relatively to one another across a preselected distance by virtue of more than one roller serving as rolling element, which is allowed to roll between the guideway members while retained in a cage or retainer.

BACKGROUND OF THE INVENTION

Most of finite linear motion guide units of the sort recited just above conventionally have a pair of elongated guideway members moveable relatively to each other, and a cage or retainer lying between the guideway members to space the rollers as rolling element from each other. The cage or retainer is constituted with a retainer plate which is set to travel over a distance of stroke half the relatively moving stroke of the guideway members. With the finite linear motion guide units constructed as stated earlier, however, the cage or retainer is likely to be off or stray in increments out of a desired location it should be relative to guideway members because of different working conditions including variations in load carried on the finite linear motion guide unit, machining accuracy of raceway grooves made on the guideway members, working geometry where the guide unit operates in an upright posture, high traveling velocity, high acceleration/deceleration, and so on. To cope with the issue stated earlier, most of the finite linear motion guide units have conventionally the cage with means for keeping the cage against straying from the desired location. A common example of the prior means for preventing the cage from straying installed in the finite linear motion guide units is composed of a rack-and-pinion mechanism in which the cage has a pinion while the guideway members have racks, respectively, so that the pinion comes into mesh with the racks to correct for the relative location of the cage to the guideway members, keeping the cage in place with respect to the guideway members.

In the commonly-assigned Japanese Laid-Open Patent Application No. 2003-176 820A, now matured into JP patent No. 3 950 683,there is disclosed a finite linear motion guide unit having a rack-and-pinion mechanism to keep the cage in place with respect to the guideway members. With the prior finite linear motion guide unit, the smaller pitch or distance between the center-lines of adjacent rollers for rolling elements that are installed in a cage or retainer results in the greater number of the rollers lying in a preselected length of the cage to get an effective raceway area where a raceway groove comes into rolling contact with the roller as wide as possible to thereby enhance the load-carrying capacity. Moreover, the raceway groove of V-shaped in transverse section is cut larger in depth as well as in width than ever to make larger the effective width of raceway surface across which the raceway surfaces of the guideway members come into rolling-contact with the rollers, making certain of the heavier load-carrying capacity. In the prior finite linear motion guide unit, moreover, there is provided a pinion-holder arrangement composed of a pinion holder and a pinion received inside the holder for revolution. The pinion-holder arrangement is installed in the cage or retainer to get the pinion coming into mesh with racks lying on the guideway members, thereby making sure of the linear motion of the guideway members relative to each other without causing displacement of the cage out of a desired relative location to the guideway members even under higher acceleration/deceleration. There is disclosed a rack composed of teeth spaced apart from one another at preselected intervals to mesh with the teeth on the pinion, and side walls extending lengthwise of the rack with flanking sidewise opposite ends of the teeth to connect the successive teeth with each other. The lengthwise sidewalls of the rack are thick sidewise to splay out with depth to come into face-to-face engagement with their associated inside surfaces of a gutter deep in the guideway member when the rack fits in the gutter, thereby helping keep securely the rack in the gutter of the guideway member.

Another commonly-assigned Japanese Laid-Open Patent Application No. 2007-232 061 discloses a finite linear motion guide unit having a rack-and-pinion mechanism in which a pinion holder is composed of a pair of pinion holder halves, which are fastened together in a snap-fit joining manner to render the pinion holder with tiny construction increased in mechanical strength to the extent making it possible to utilize the pinion holder in large machines. The means for keeping the cage in place relatively to the guideway members in the prior finite linear motion guide unit recited just earlier is comprised of a pinion holder fitting into a window cut in the cage, racks lying on sides of the guideway members, one to each side, and a pinion provided with teeth mating with the racks and installed in the cage for rotation. The pinion holder is made up of holder halves, any one of which lies on any one side of the cage along a marginal edge of the cage at the same marginal edge of the window. The holder halves have sidewise extensions or flanges to firmly squeeze the cage between them along the marginal edge of the window.

With the finite linear motion guide unit disclosed in the prior art recited the second patent literature, nevertheless, the cylindrical rollers for rolling elements are retained in the cage by means of fingers which need a space larger than a thickness of the cage to bear any one of axially opposite ends of the roller. As a result, the finger construction as stated earlier is inevitably hard to makes the effective raceway area where a raceway groove comes into rolling contact with the roller as wide as possible to increase the load-carrying capacity. Moreover, when making the raceway grooves in the guideway members larger in depth while rendering the cage plate as less as possible in thickness to ensure the effective raceway area wider than ever, there can be provided no construction to retain the rollers on the edges around the openings to receive the rollers therein. As a result of no construction to retain the rollers, the rollers might be more likely to easily fall away from the cage on assembling phase of the finite linear motion guide unit.

Meanwhile, modern industries are in need of the finite linear motion guide unit more in load-carrying capacity than ever as well as capable of operating under working conditions which expect the guideway members to travel or move past relatively each other with higher acceleration/deceleration. With the prior finite linear motion guide unit, a cage plate 46 for a cage or retainer 45 constructed as shown, for example, in FIG. 18 is made therein with a series of elliptical openings 47 to receive therein the rollers. Nevertheless, there is provided no means such as fingers and so on to retain the rollers in the cage. This means the cage plate 46 in itself and of itself couldn't retain or keep the rollers in place.

SUMMARY OF THE INVENTION

The present invention, therefore, has as its primary object to overcome the major issues discussed earlier and in particular to provide an improvement in a cage plate most suitable for application to a cage or retainer built in a finite linear motion guide unit of the sort which is disclosed in the senior Japanese Laid-Open Patent Application No. 2010-236604, that is, the finite linear motion guide unit having the rack-and-pinion mechanism inexpensive in production to keep the cage against straying our of the desired location in preparation for higher acceleration/deceleration.

More particular, the present invention is intended to provide the finite linear motion guide unit in which the cage plate in itself and of itself may retain or keep the rollers in place so as to facilitate and simplify handling of the rollers and other parts on manufacture and assembly phases. To this end, the finite linear motion guide unit of the present invention features the cage plate having bearing lips to give the cage plate the function of retaining the rollers with the cage plate in itself and of itself thereby improving the convenience of handling the rollers and parts, in addition to the constructional feature in that the smaller pitch or distance between the center-lines of adjacent rollers for rolling elements that are installed in a cage or retainer results in the greater number of the rollers lying in a preselected length of the cage to get an effective raceway area where a raceway groove comes into rolling contact with the roller as wide as possible to thereby make certain of heavier load-carrying capacity, as opposed to the prior product in which it was impossible to enlarge the effective raceway area where a raceway groove comes into rolling contact with the roller.

The present invention is concerned with a linear motion guide unit, comprising; a pair of guideway members lying movable relatively to one another and having confronting raceway grooves on their sides extending in lengthwise direction, a plurality of rollers for rolling element arranged in a raceway defined between the raceway grooves to roll through on raceway surfaces on the raceway grooves, and a cage of a flat cage plate extending in a lengthwise direction of the guideway members and retaining therein the rollers at preselected intervals in such geometry that their own axes tilt alternately in opposite direction to one another;

wherein the cage plate has openings to retain the rollers therein arranged to space the respective rollers from each other in the lengthwise direction, the openings each having a contour whose major axis lies in a widthwise direction of the cage plate; wherein the openings are provided inside with bearing lips to retain axially opposite end surfaces of the rollers, the bearing lips extending inside from an edge around the opening at locations corresponding with diametrically opposite ends of the major axis of the opening, and the bearing lips being facing each other and ending into wedged bearing edges deformable elastically; wherein the bearing edges have bearing slants each adapted to conform to the end surface of the roller to bear the roller thereon; and wherein the bearing slants are in diametrically symmetric relation to each other at the ends of the major axis of the opening.

In the present invention, a linear motion guide unit is disclosed in which the rollers are born on the bearing lips inside the respective openings and arranged in such geometry that their own rotating axes tilt alternately in opposite directions at 90 degrees relatively to one another. Moreover, there is disclosed a linear motion guide unit in which the bearing lips extending from the locations corresponding with the ends of the major axis towards a center of the opening are less in thickness than a thickness of the cage plate to provide recesses to reserve lubricant on the bearing lips at the locations corresponding with the ends of the major axis, and an overall length of the bearing lips lies in a space defined between opposite major surfaces of the cage plate.

In the present invention, a linear motion guide unit is disclosed in which one of the axially opposite end surfaces of the roller is kept in abutment against the bearing slant on the bearing edge of one bearing lip and the rolling surface of the roller adjacent to another end surface of the roller is forced against a rear surface of the another bearing edge of the bearing lip to turn the roller to set the roller up whereby the roller at the rolling surface thereof causes the bearing edge to deform elastically to negotiate or get over the end of the bearing edge to make engagement at the axially opposite end surfaces with the bearing lips to fit snugly into the opening.

In the present invention, a linear motion guide unit is disclosed in which a mechanism to prevent the cage from getting out of place or straying out of a desired relative location to the guideway members is constituted with a rack-and-pinion mechanism composed of a pinion installed for rotation in a pinion holder which fits into a window cut in middle of the cage plate, and elongated racks secured lying in raceway grooves cut lengthwise in the guideway members, one to each guideway member.

In the present invention, a linear motion guide unit is disclosed in which the bearing edges on the bearing lips are beveled to provide the bearing slants each of which conforms to the end surface of the roller retained tilting at 45 degrees with respect to the flat major surfaces of the cage plate, and wherein the bearing slants are at the locations corresponding to the ends of the major axis of the opening in geometry facing with each other.

In the present invention, a linear motion guide unit is disclosed in which side walls defining the opening in the cage plate when viewed on a plane taken along minor axis of the opening is either of surfaces lying perpendicular to the major surfaces of the cage plate or surfaces tilted at a preselected angles relatively to the major surfaces of the cage plate. Moreover, the opening to retain the roller therein has a contour of ellipse having the major axis lying in the widthwise direction of the cage plate and the minor axis lying in the lengthwise direction of the cage plate. As an alternative, the opening has a contour of polygon having the major axis lying in the widthwise direction of the cage plate and the minor axis lying in the lengthwise direction of the cage plate, and further having straight lengths extending in the middle widthwise of the cage plate in a way lying in parallel and in opposition to each other.

In the present invention, a linear motion guide unit is disclosed in which the opening to fit over the roller is defined with the straight lengths extending in the middle widthwise of the cage plate to allow the roller to pass diametrically between them across the cage plate, and edges starting at the straight lengths and converging on the end of the major axis to make an interval between straight lengths less to prevent the roller born on the bearing lips from falling away through the opening.

With the finite linear motion guide units constructed as stated earlier to implement the higher-loading requirement, the cage plate for the cage lying between the guideway members is provided therein with the greater number of openings to retain the respective rollers therein, which are arranged in the lengthwise direction of the cage plate as closer as possible with each other. Thus, the smaller pitch or distance between the center-lines of adjacent rollers that are installed in a cage or retainer results in the greater number of the rollers lying in a preselected length of the cage to get an effective raceway area where a raceway groove comes into rolling contact with the roller as wide as possible to thereby enhance the load-carrying capacity. Moreover, the raceway groove of V-shaped in transverse section is cut larger in depth as well as in width than ever to make larger the effective width of raceway surface across which the raceway surfaces of the guideway members come into rolling-contact with the rollers, making certain of the heavier load-carrying capacity. The finite linear motion guide unit of the present invention has the constructional feature that the openings are provided inside with the bearing lips which are laid at locations corresponding the ends of the major axis of the opening and extended towards each other only within a space defined between the opposite major surfaces of the cage plate very thin in thickness, the bearing lips ending in the wedged bearing edges deformable elastically, on the bearing edges there are provided bearing slants adapted to bear or retain the rollers thereon. The bearing edges deformable elastically make it easier to mount and/or dismount the rollers to the cage plate, making it easier to handle the cage plate on assemblage phase. As the cage plate having the constructional feature as stated earlier is simple in structure and inexpensive in production cost, the finite linear motion guide unit having the cage plate of the present invention is better for use in a variety of machinery including semiconductor manufacturing equipment, precision measuring machines, inspection equipment, assembly machines, industrial robots, and so on. In the finite linear motion guide unit of the present invention, moreover, there is provided a pinion-holder arrangement composed of a pinion holder fitted into the window cut in the cage plate and a pinion received inside the holder for revolution. On the other hand, the racks are laid on the raceway grooves in the guideway members to come into mesh with the pinion to constitute the rack-and-pinion mechanism to make sure of the linear motion of the guideway members relative to each other without causing displacement of the cage out of a desired relative location to the guideway members even under higher acceleration/deceleration.

DETAILED DESCRIPTION OF THE INVENTION

Finite linear motion guide units with cage or retainer constructed according to the present invention will be described in detail with reference to the accompanying drawings. The finite linear motion guide unit discussed later is adapted for use in between relatively sliding parts of a variety of machinery including semiconductor manufacturing equipment, precision measuring machines, precision inspection equipment, precision assembly machines, machine tools, industrial robots, and so on.

Figure 1:
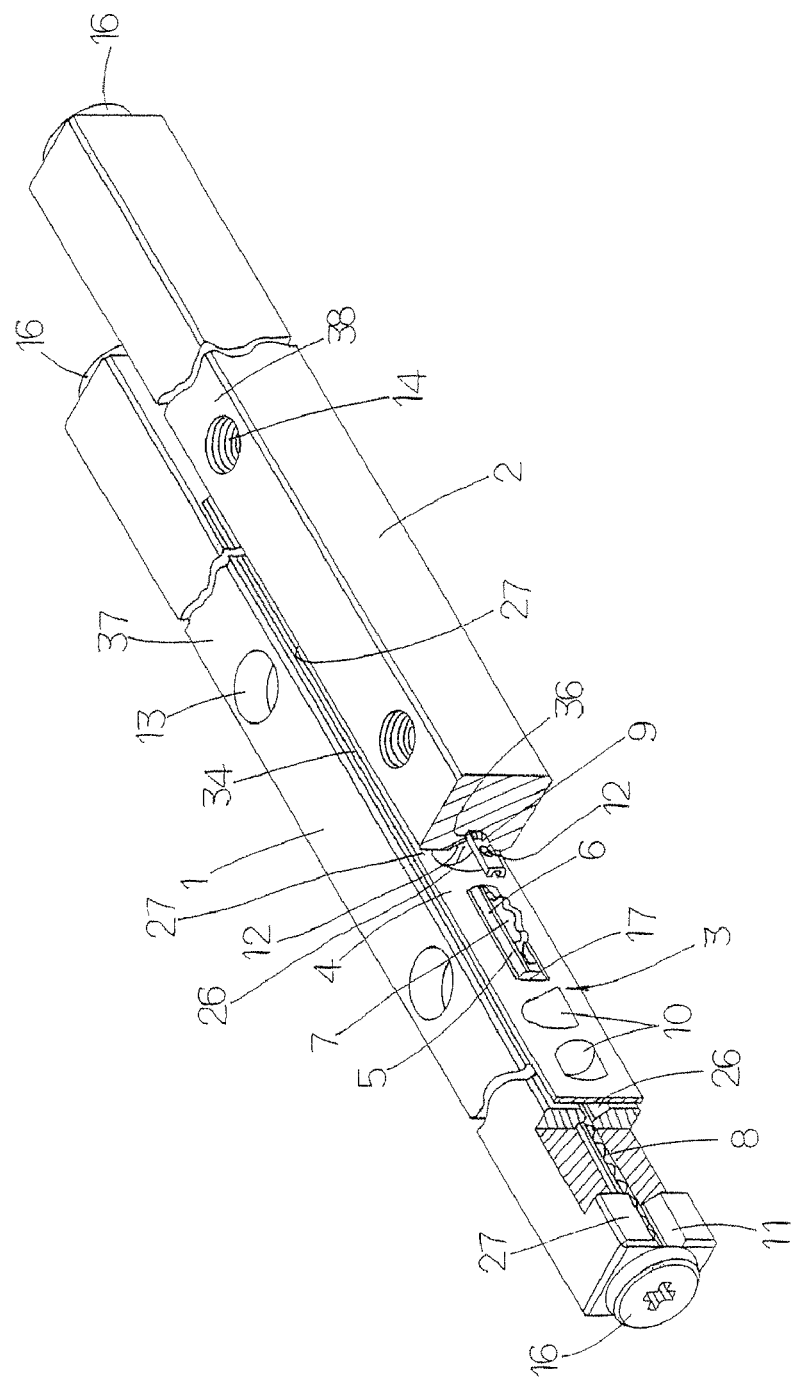
FIG. 1 is a view in perspective, partially broken away, showing a preferred embodiment of a finite linear motion guide unit according to the present invention.
Figure 2:
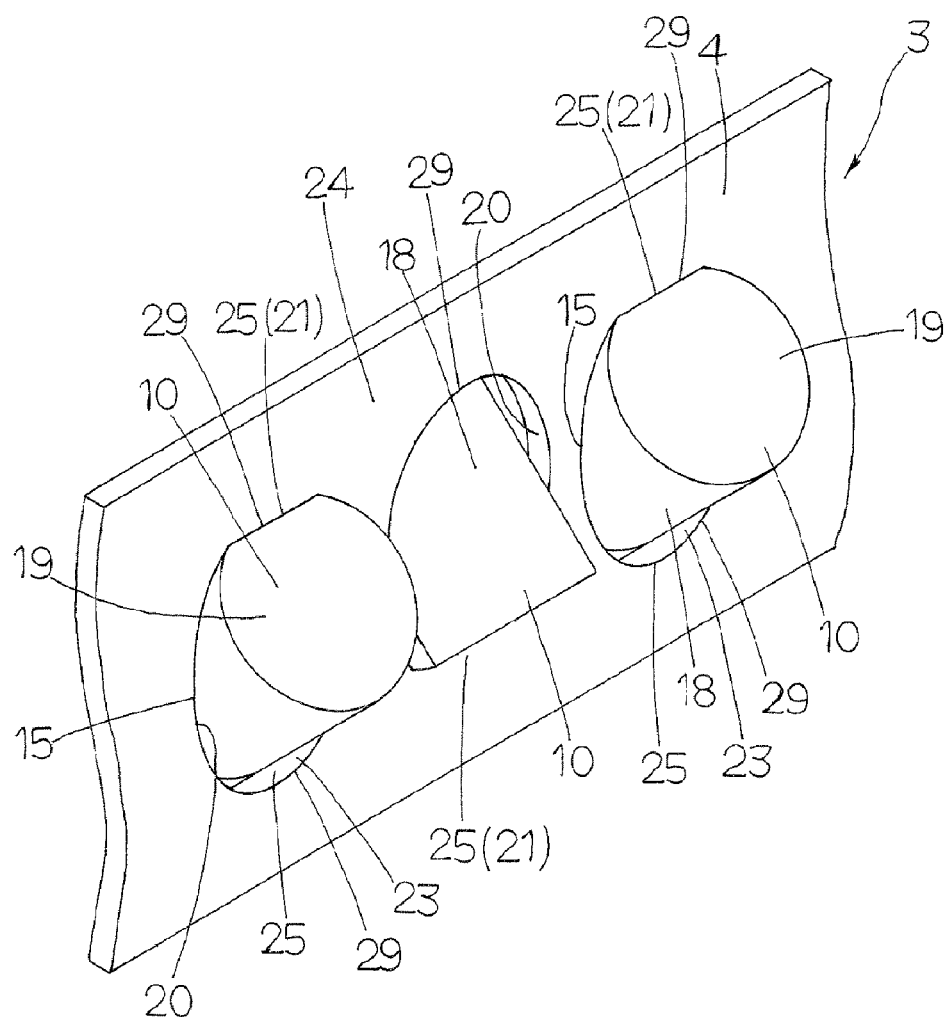
FIG. 2 is an enlarged fragmentary view in perspective of a cage or retainer to be installed in the finite linear motion guide unit of FIG. 1, illustrating in detail how rollers are installed in respective openings made in a cage plate.
Figure 3:
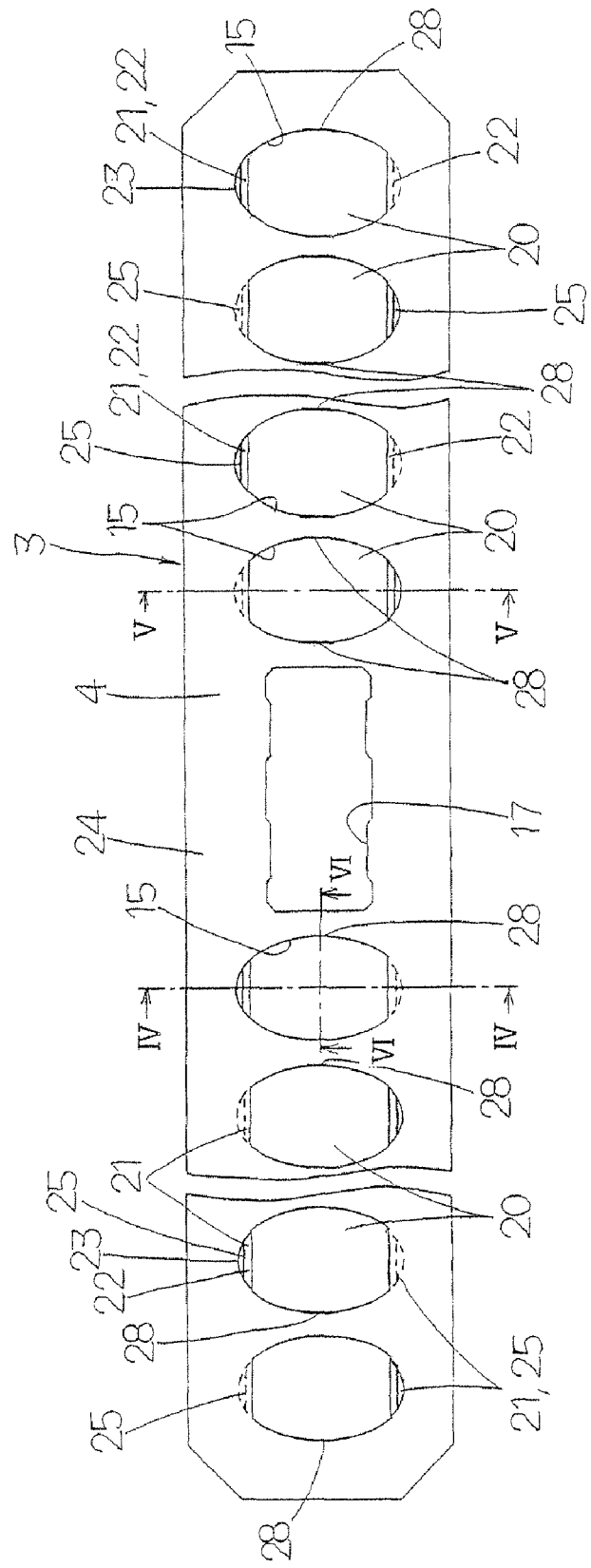
FIG. 3 is a partially broken view in plan showing a preferred version of the cage plate to provide the cage to be installed in the finite linear motion guide unit of FIG. 1.
Figure 4:
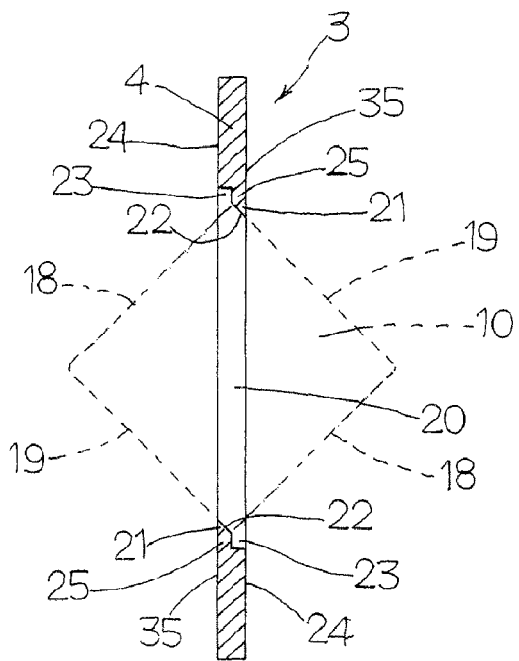
FIG. 4 is a view in transverse section of the cage plate, the view being taken along the plane lying on the line IV-IV of FIG. 3 extending coincidently with the major axis of the opening in perpendicular to the lengthwise direction of the cage plate.
Figure 5:
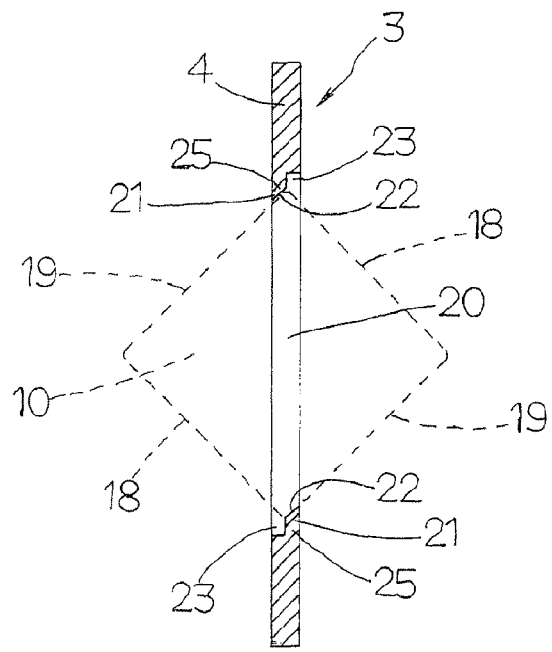
FIG. 5 is a view in transverse section of the cage plate, the view being taken along the plane lying on the line V-V of FIG. 3 extending coincidently with the major axis of the opening in perpendicular to the lengthwise direction of the cage plate.
Figure 6:
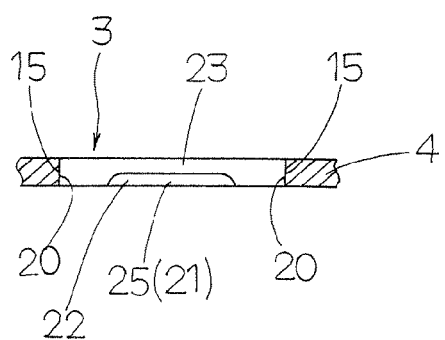
FIG. 6 is a fragmentary view in transverse section of the cage plate, the view being taken along the plane lying on the line VI-VI of FIG. 3 extending coincidently with the minor axis of the opening in parallel with the lengthwise direction of the cage plate.
Figure 7:
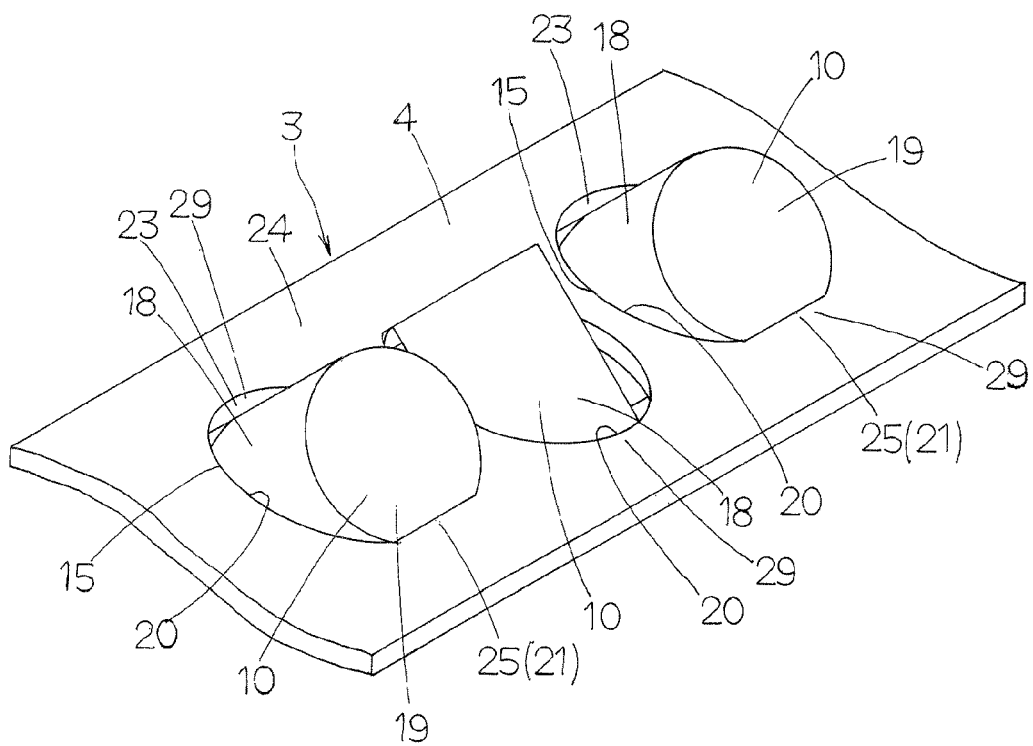
FIG. 7 is an enlarged fragmentary view in perspective of the cage to illustrate how rollers are installed in respective openings made in a cage plate, but the rollers being shown opposite in inclination to the rollers in FIG. 2.

The finite linear motion guide unit of the present invention as shown in FIG. 1 is mainly comprised of a pair of lengthwise guideway members 1 and 2 allowed to move in relatively sliding across a desired distance by virtue of more than one roller 10 rolling through a load-carrying raceway 34 defined between the guideway members 1 and 2, and a cage or retainer 3 of a cage plate 4 used to space the rollers 10 at preselected intervals. The finite linear motion guide unit constructed as stated earlier has commonly a specific mechanism to prevent the cage or retainer 3 from getting out of place or straying out of place. The preventive mechanism is composed of a pinion-and holder assembly 5 which is made up of a pinion holder 6 to fit into a window 17 cut in the middle of the cage plate 4 and a pinion 7 installed inside the pinion holder 6, and elongated racks 8 and 9 secured lying in raceway grooves 26 cut lengthwise in the guideway members 1 and 2, one to each guideway member. Thus, the pinion 7 comes into mesh with the racks 8 and 9 to correct for the relative location of the cage 3 to the guideway members 1 and 2, thereby keeping the cage 3 in place with respect to the guideway members 1 and 2 without causing displacement of the cage 3 out of a desired relative location to the guideway members 1 and 2.

The guideway members 1 and 2 are made rectangular in transverse section and have raceway grooves 26 extending lengthwise on their sides 27 lying in opposition to each other. The raceway grooves 26 have each a V-shape in cross section defined between raceway surfaces 11 and 12 that extend in parallel with one another to form a relief valley 36 cut deep along a lengthwise bottom of the associated raceway groove 26. The racks 8 and 9 are each laid on the deep bottom of the associated relief valley 36 to extend lengthwise of the guideway members 1 and 2. The roller 10 is a right circular cylinder having a rolling or circular surface 18 around a rotating axis and axially opposite end surfaces 19. The upside raceway surface 11 and downside raceway surface 12 to form the raceway groove 26 of V-shape in transverse section tilt 45 degrees with respect to the sides of the guideway members 1 and 2 in conformity with a tilt of the rotating axis of the roller 10 so as to extend at right angles relative to each other. Between the guideway members 1 and 2 facing each other on their sides, there is placed the flat cage plate 4 for the cage or retainer 3 to space a plurality of the rollers 10 from each other at preselected intervals. The cage plate 4 for the cage 3 has at the lengthwise middle thereof the window 17 to fit over the pinion holder 6 of, for example, flat configuration. Inside the pinion holder 6, the pinion 6 is carried for rotation with a pinion shaft lying in perpendicular to the lengthwise direction of the cage plate 4. The pinion 7 comes into mesh with the racks 8 and 9. The pinion 7 installed in the window 17 in the cage plate 4 is flanked by the rollers 10 successive in the lengthwise direction. The rollers 10 are arranged in a fashion alternately tilting 45 degrees in opposition with respect to the all-over flat major surfaces 24 of widthwise opposite major sides of the cage plate 4 so that the rotating axes of any two adjoining rollers 10 intersect at the right angles relative to each other.

The racks 8 and 9 each have a ladder-like construction as disclosed in, for example, the commonly-owned JP patent No. 3 950 683. The racks 8 and 9 are placed in the relief valleys 36 lying on the guideway members 1 and 2, one to each valley. Especially, the racks 8 and 9 each fit into a slot, which is cut in a wedged shape in transverse section to widen the bottom of the relief valleys 16. The guideway members 1 and 2 are each provided at forward and aft ends thereof with an end screw 16 having a stopper head to cover the raceway groove 26, thereby limiting the length of stroke to keep the cage 3 from escape out of the associated guideway member 1 and 2. On lengthwise surfaces 37 and 38 extending in perpendicular to the sides 27 of the guideway members 1, 2 having the raceway grooves 26 thereon, there are made some bolt holes 13 that are positioned lengthwise at preselected intervals to be used to fasten the guideway members 1, 2 to any components such as moving table or counterparts such as a machine bed, basement and so on, not shown. The bolt holes 13 are countersunk to conceal the bolt heads and some of the bolt holes 13 are internally threaded at 14 to fit over the associated bolts driven from the side of the machine bed or moving table.

Referring to FIGS. 2 to 15, there is shown a preferred embodiment of the finite linear motion guide unit having the constructional feature of the present invention. The present invention is especially envisaged developing the cage or retainer 3 capable of retaining the rollers 10 in itself and of itself with better convenience of handling the rollers and parts to improve the assemblage performance or production efficiency of the finite linear motion guide unit while comparable to any conventional cage or retainer in heavier load-carrying capacity and in higher acceleration/deceleration operation. Especially, the cage or retainer 3 according to the present invention features the construction to retain or keep the roller 10 inside the opening 20 cut in the cage plate 4. With the finite linear motion guide unit of the present invention, the cage 3 has a simple bearing edge 21 which makes it possible to retain the roller 10 in less space or gap left between the guideway members 1 and 2. The finite linear motion guide unit having the cage 3 constructed as just above features less number of required parts, simple and slim construction and inexpensive in production. In the embodiment discussed here, the opening 20 to retain the roller 10 therein has an elliptic contour having the major axis extending in the widthwise direction of the cage plate 4 and the minor axis in the lengthwise direction of the cage plate 4. The finite linear motion guide unit of the present invention features the construction of the flat cage plate 4 for the cage 3 in which bearing lips 25 to keep the roller 10 in the elliptic opening 20 are provided on a circular edge around the elliptic opening 20 in pairs at opposite ends 29 of the major axis of ellipse. Especially, the bearing lips 25 to support thereon the roller 10 received in the opening 20 is each formed to extend into the opening 20 so as not to jut or project sidewise beyond either of the all-over flat major surfaces 24 of the cage plate 4, but to lie entirely within a space defined between the opposed all-over flat major surfaces 24 of the cage plate 4. In other words, an overall length of the bearing lips 25 is confined in thickness dimension defined between opposite flat major surfaces of the cage plate 4. The bearing lips 25 are formed in pairs around the opening 20 at locations opposite across the major axis of the elliptic opening 20.

With the finite linear motion guide unit, the cage plate 4 for the cage 3 has a plurality of the openings 20 arranged in line to place the rollers 10 side by side in the lengthwise direction of the cage plate 4. The openings 20 each have the elliptic contour having the major axis extending in the widthwise direction of the cage plate 4 and the minor axis in the lengthwise direction of the cage plate 4. The bearing lips 25 extended in pairs into the opening 20 at the opposite ends 29 of the major axis have at their tips bearing edges 21 which are deformable resiliently. The bearing edge 21 at the tip of the bearing lip 25 is made in a wedged shape having a bearing slant 22 adapted to come into contact with any one of axially opposite ends surfaces 19 of the roller 10 to thereby bear the roller 10 thereon. The bearing slants 22 are placed on the bearing lips 25 in opposition to and in symmetry with each other at the opposite ends 29 of the major axis of the opening 20. The bearing lip 25 with the bearing edge 21 at the tip thereof extends from a circular edge 15 of the opening 20 at the end 29 of the major axis towards the center of the opening 20 in a fashion lying entirely in the opening 20 so as not to jut or project sidewise over the thickness of the cage plate 4 or beyond either of the all-over flat major surfaces 24 of the cage plate 4. Moreover, the bearing edge 21 is beveled to have the bearing slant of 45 degrees with respect to the flat major surfaces 24 of the cage plate 4 while a rear surface of the bearing edge 21 lies in coplanar or flush with the flat major surfaces 24 of the cage plate 4. The bearing edge 21 tapering off as stated earlier, after having been forced or pressed with the end surface 19 of the roller 10, easily experience elastic deformation to thereby permit the roller negotiating or getting over the end of the bearing edge 21.

With the finite linear motion guide unit of the present invention, the cage plate 4 for the cage 3 is made of a very thin sheet and has the window 17 at the lengthwise middle thereof to have installed therein the pinion-holder assembly 5 serving as the preventive mechanism. The window 17 in the cage plate 4 is flanked by the elliptic openings 20 which are successive in the lengthwise direction of the cage plate 4 and spaced away from each other at preselected intervals to arrange the rollers 10 in a way spaced at preselected intervals. The openings 20 are made slightly larger than a diameter of the roller 10.

Many rollers 10 are installed in their respective openings 20 in the cage plate 4 in such geometry that their own axes tilt alternately at 90 degrees relatively to one another. The bearing lip 25 extending towards the center of the opening 20 is less in thickness than the thickness of the cage plate 4 to provide a recess or a lubricant pool 23 on the bearing lip 25 at the location corresponding with one end 29 of the major axis. With the version discussed here, especially, the bearing lip 25 extending from the end 29 of the major axis towards the center of the opening 20 has a thickness of a matter of a half or less, that is, ½ or less the thickness of the cage plate 4. Within the remaining space across about ½ the thickness of the cage plate 4 at the end 29 of the major axis, moreover, there is provided the recess 23 to reserve the lubricant therein.

Figure 8:
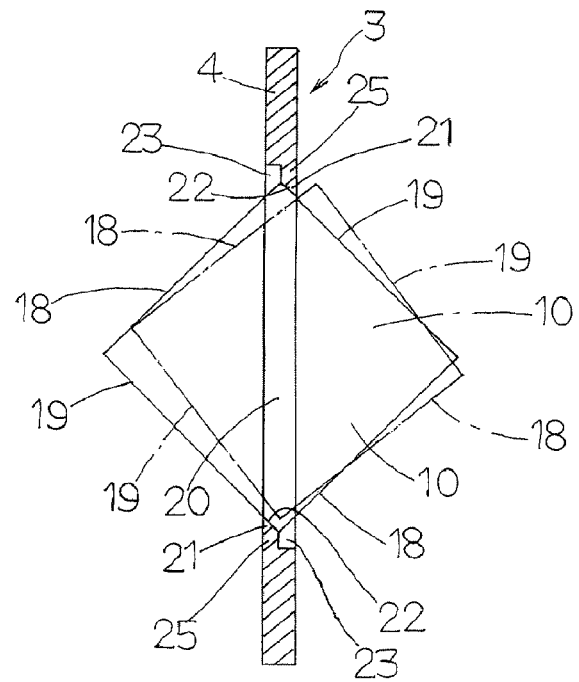
FIG. 8 is a view in transverse section of the cage plate to illustrate how the roller fits into the opening formed in the cage plate.
Figure 9:
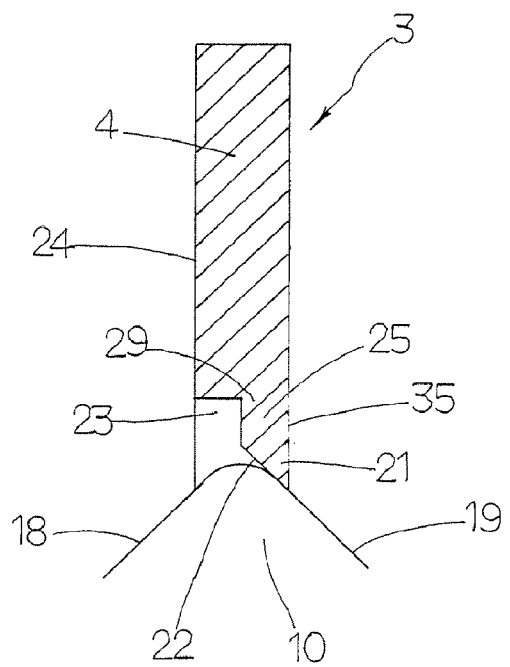
FIG. 9 is an enlarged fragmentary view in transverse section illustrating the phase after the roller has fit into the relevant opening in the cage plate.

Referring FIGS. 8 and 9, there is shown how the roller 10 is built in the elliptic opening 20. While any one of the axially opposite end surfaces 19 of the roller 10 is kept in abutment against the bearing slant 22 on any one bearing edge 21 of the bearing lips 25 opposite across the opening 20 on the major axis of ellipse, the rolling surface 18 of the roller 10 nearby another end surface 19 of the roller 10 is forced or squeezed against the rear surface of another bearing edge 21 of the bearing lip 25 to turn the roller 10 to set the roller 10 up whereby the roller 10 at the rolling surface 18 thereof causes the bearing edge 21 to deform elastically to negotiate or get over the end of the bearing edge 21 to fit snugly into the opening 20. With the finite linear motion guide unit constructed as stated earlier, the upside and downside bearing lips 25 extending in any one elliptic opening 20 from their associated ends 29 of the major axis with the thickness of about a half or ½ the thickness of the cage plate 4 are staggered or set-off center from each other in thickness-wise of the cage plate 4 and in opposite directions with respect to a mid plane lying in parallel with and between the opposite major surfaces 4 of the cage plate 4. Moreover, the set-off center or staggered relation between the upside and downside bearing lips 25 with respect to a mid plane lying between the opposite major surfaces 4 of the cage plate 4 is reversed or turned upside down alternately among the adjoining openings 20. Each of the bearing lips 25 ends in the bearing edge 21 having the bearing slant of 45 degrees with respect to the major surfaces 24 of the cage plate 4 to conform closely to the associated end surface 19 of the roller 10 to be built in the cage plate 4 in a posture tilted at 45 degrees relatively to the cage plate 4. The bearing lips 25 in the elliptic opening 25 are provided at the locations corresponding to the ends 29 of the major axis of the ellipse in geometry their bearing slants 22 are faced with each other to bear the associated end surface 19 of the roller 10.

Figure 10:
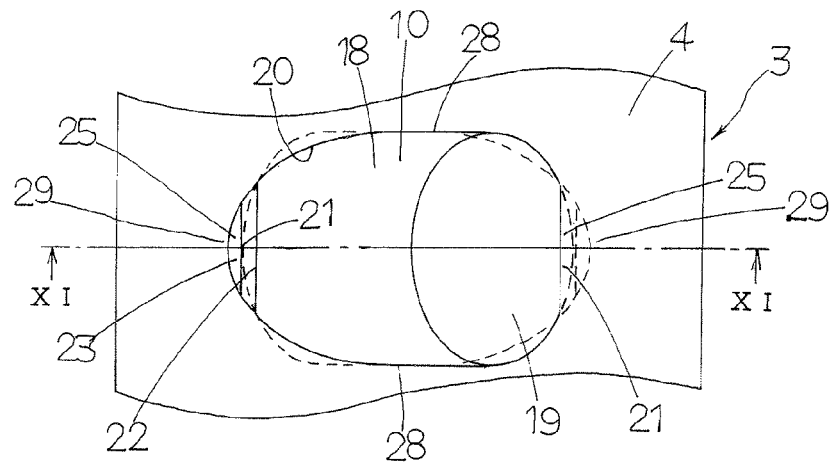
FIG. 10 is an enlarged fragmentary view in plan illustrating the phase after the roller has fit into the relevant opening in the cage plate.
Figure 11:
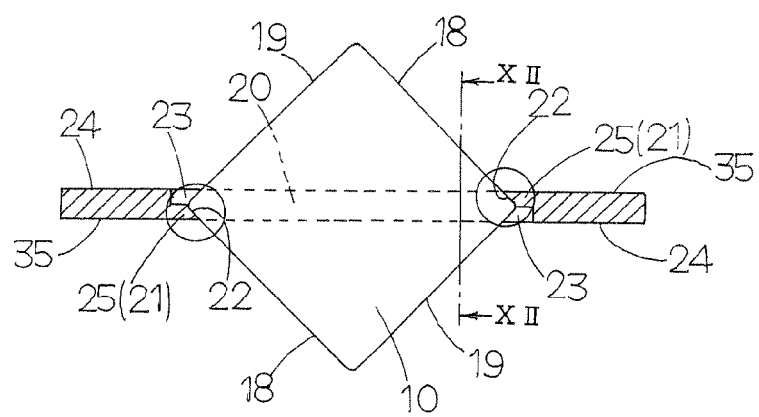
FIG. 11 is an enlarged fragmentary view in transverse section taken along the plane lying on the line XI-XI of FIG. 10 extending coincidently with the major axis of the opening. Especially, there is shown a bearing lip raised in the opening to come into contact with any one of axially opposite end surfaces of the roller looking toward any one major surface of the cage plate, thereby keeping the roller against slipping off past the opening from the major surface to the opposite major surface of the cage plate across the cage plate.
Figure 12:
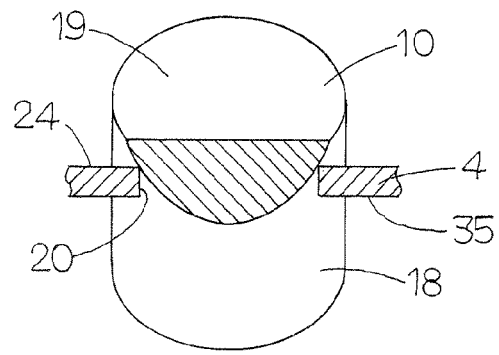
FIG. 12 is an enlarged fragmentary view in transverse section taken along the plane lying on the line XII-XII of FIG. 11 extending perpendicularly to the major axis of the opening. Especially, there is shown a part of the cage plate carrying a rolling or circular surface of the roller in rolling-contact relation at a location opposite to the bearing lip on the major axis of the opening in the axial direction of the roller.
Figure 13:
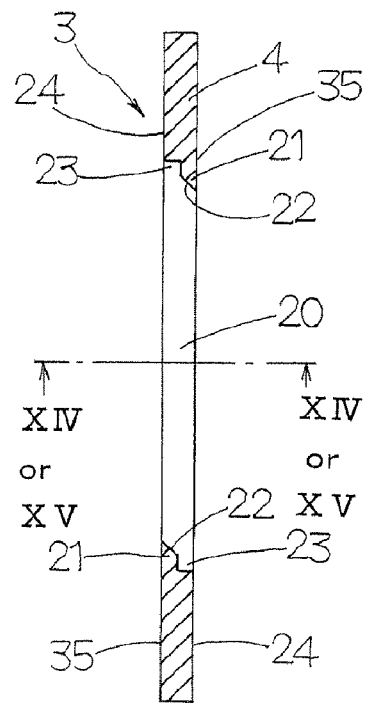
FIG. 13 is a view in transverse section showing a version of the opening taken along the plane lying on the major axis of the opening formed in the cage plate.
Figure 14:
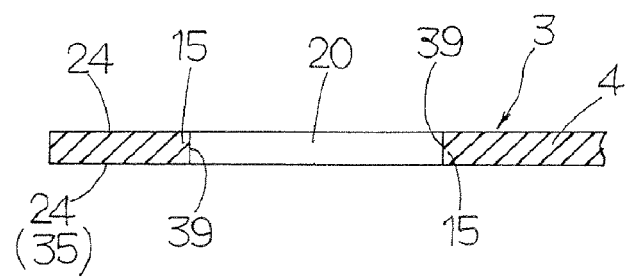
FIG. 14 is a view in transverse section showing another version of the opening taken along the plane equivalent to XIV-XIV of FIG. 13.
Figure 15:
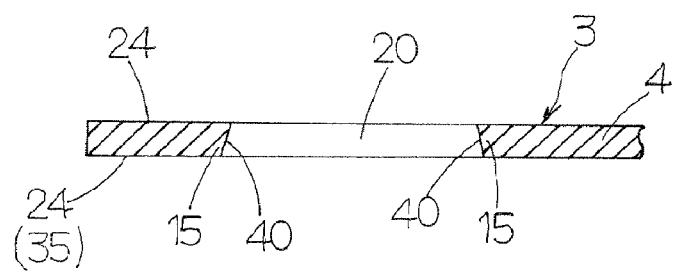
FIG. 15 is a view in transverse section showing a further another version of the opening taken along the plane equivalent to XV-XV of FIG. 13.

More especially, the bearing slants 22 on the bearing edges 21 of the bearing lips 25 are in parallel with the associated end surfaces 19 of the roller 10 to be built in the cage plate 4 in a posture tilted at 45 degrees relatively to the cage plate 4, and further placed at the ends 29 of the major axis of the ellipse so as to face with each other. Referring to FIG. 10, there is shown the phase where the roller 10 has fit into the elliptic opening 20 in the cage plate 4. In FIG. 11, there is shown a fragmentary view in transverse section taken along the plane lying on the line XI-XI of FIG. 10 extending coincidently with the major axis on two foci of the elliptic opening. The event is seen in which the bearing lip 25 of the cage plate 4 has the inclination adapted to come into contact with the end surface 19 of the roller 10 facing towards one of the major surfaces 4 of the cage plate 4 to thereby keep the roller 10 against going by the opening 20 from the different major surface 24 to the one major surface 24 across the cage plate 4. Next, in FIG. 12, there is shown a view in transverse section taken along the plane lying on the line XII-XII of FIG. 11 to explain the relation between the roller 10 and the cage plate 4 carrying the rolling surface of the roller 10 at a location near the end of the major axis opposite to the bearing lip 25 bearing the end surface 19 of the roller 10 thereon. More in detail in FIG. 12, the elliptic opening 20, when taken along the plane lying on the line XII-XII of FIG. 11, is smaller widthwise in the direction of the minor axis than the maximum dimension diametrically across the outside contour of the roller 10 to thereby prevent the roller 10 from going by the opening 20 from the different major surface 24 to the one major surface 24 across the cage plate 4. Moreover, side walls 15 edging the elliptic opening 20 in the cage plate 4 may be either of normal surfaces 39 lying perpendicular to the major surfaces 24 of the cage plate 4 as shown in FIG. 14 taken along the plane equivalent to the line XIV-XIV of FIG. 13 or different surfaces 40 tilted at a preselected angles relatively to the major surfaces 24 of the cage plate 4 as shown in FIG. 15 taken along the plane equivalent to the line XV-XV of FIG. 13.

Referring again to FIGS. 10 to 12, the opening 20 to fit over the roller 10 is defined with substantially linear lengths 28 extending in the middle widthwise of the cage plate 4 to allow the roller 10 to pass diametrically between them across the cage plate 4, and elliptically curved edges 15 starting at the linear lengths 28 and converging on the 29 of the major axis to make an interval between linear lengths 28 less gradually. As a result, the roller 10 born on the bearing lip 25 comes into abutment at the rolling surface 18 thereof against the curved edge 15 around the opening 20 to be kept against falling away through the opening 20. With the opening 20 constructed as stated earlier, the linear lengths 28 lie in opposition to each other across the interval which is longer than the diametral dimension of the roller 10 so as to allow the roller 10 passing through the opening 20 across the cage plate 4. For example, now considering the roller 10 of right circular cylinder whose axial length is identical with the diameter D, a diagonal length of the roller 10 comes to $D \times \sqrt{2}$. Thus, a length along the curved edge 15 from the end 29 of the major axis up to a location corresponding to a quarter of the major axis may be written as $(D \times \sqrt{2})/4 = D/2\sqrt{2}$.

A position further $D/2\sqrt{2}$ away ahead is the center of the ellipse defining the opening 20 to retain the roller 10 therein. A periphery of the opening 20 around the center of the opening 20 is defined with linear lengths 28 which are spaced away from each other with the interval of just over the diameter of the roller 10. When envisioning casting the roller 10 retained in the cage 3 on the cage plate 4, a location where the width of the roller's shadow is identical with the diameter D of the roller 10 may be identified to be the specific location further shifted away by D/2 √2 from the center of the opening 20 towards the end 29 of the major axis. Over the elliptic curved edge 15 ranging from the specific location identified as stated earlier to the bearing lip 25, the opening 20 is less in widthwise dimension than the diameter of the roller 10. This means that the roller 10 is held or born securely on the rolling surface 18 thereof inside the opening 20 along the elliptic curved edges 15 around the opening 20 to be prevented from slipping or falling away from the cage 3.

Figure 16:
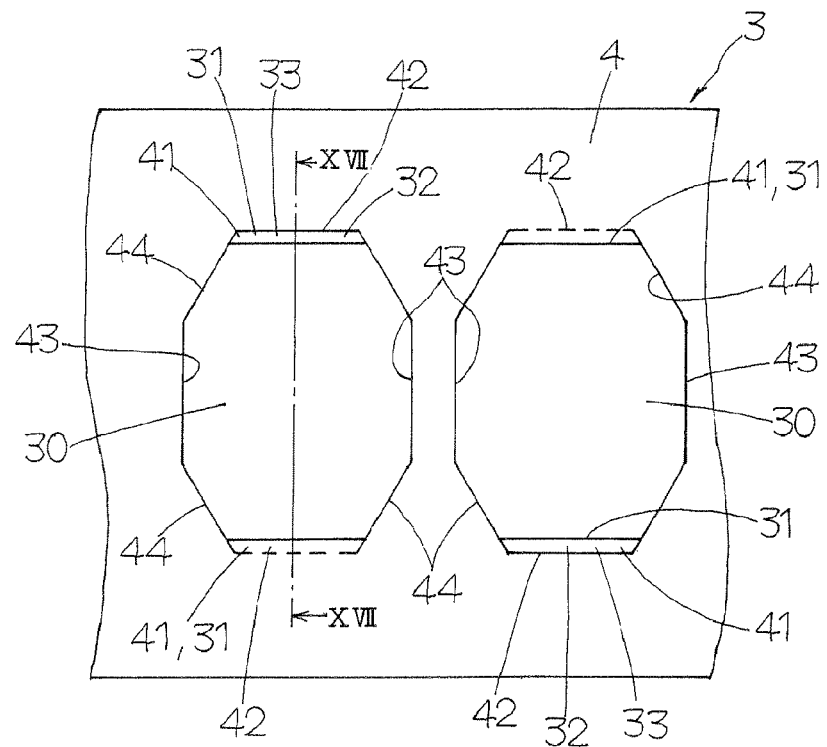
FIG. 16 is a fragmentary enlarged view in plan showing another modified version of the cage plate for the cage to be installed inside the finite linear motion guide unit of FIG. 1. This modification of the cage plate has an opening of any contour other than the ellipse and the roller is born at the end surface thereof with the bearing lip while at the rolling surface thereof with two locations on the edge around the opening.
Figure 17:
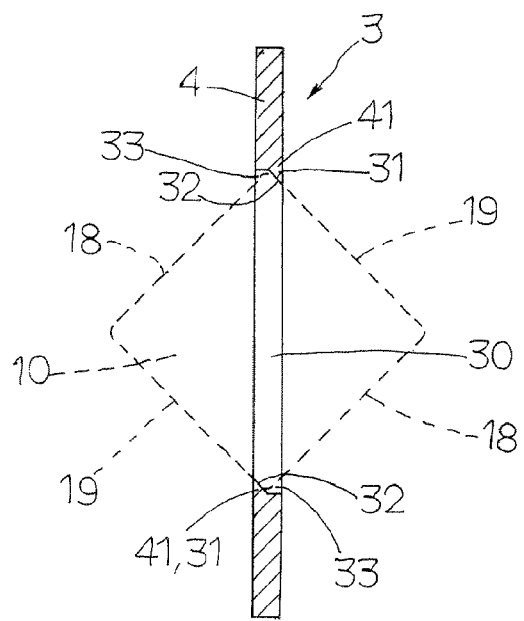
FIG. 17 is a view in transverse section of the cage plate taken along the plane XVII-XVII of FIG. 17.
Figure 18:
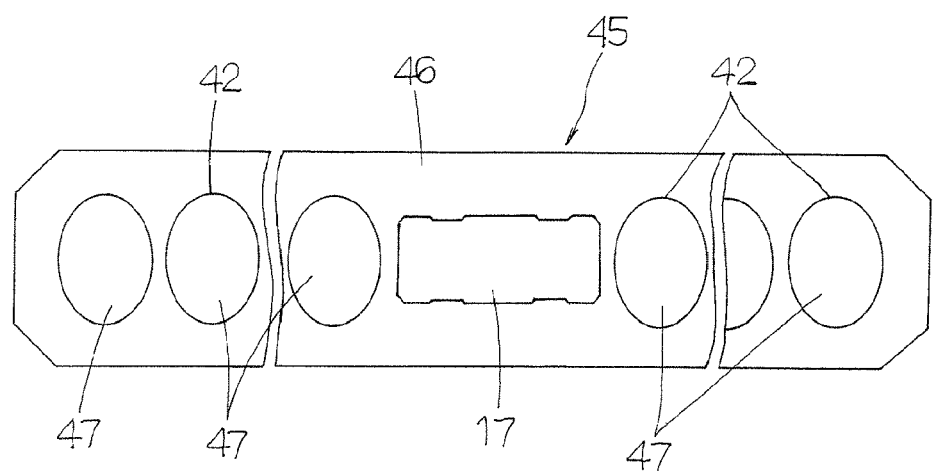
FIG. 18 is a view in plan showing an example of the conventional cage plate for the cage having a series of openings to receive rollers therein, but the pockets have no bearing lips to keep the rollers in the pockets.

Another version of the finite linear motion guide unit of the present invention will be explained later with reference to FIGS. 16 and 17. With this second version, a modified opening 30 to retain the roller therein is formed in a polygonal contour which is defined with straight lengths 43 extending in the middle widthwise of the cage plate 4 in a way lying in parallel and in opposition to each other so as to have a major axis in the widthwise direction and a minor axis in the lengthwise direction of the cage plate 4. Thus, the modified opening 30 is entirely constituted with tangents circumscribed about the elliptic opening as stated earlier, that is, straight lengths 43 extending in the middle widthwise of the cage plate 4, straight edges 44 starting at the linear lengths 43 and converging on the 42 of the major axis, and bearing lips 41 lying at the ends 42 of the major axis. The bearing lips 41 starting at the end 42 of the major axis end in bearing edges 31 extend towards the center of the opening 30. The bearing edge 31 at the tip of the bearing lip 41 is made in a wedged shape having a bearing slant 32 adapted to come into contact with any one of axially opposite ends surfaces 19 of the roller 10 to thereby bear the roller 10 thereon. With the second version described here, after the roller 10 has been installed inside the associated opening 30, the end surface 19 of the roller 10 comes into contact with the bearing slant 32 on the bearing lip 41 so that the roller 10 is retained on the bearing edge 31 of the bearing lip 41. Moreover, the bearing slant 32 is made tapered into a wedged shape so as to provide a recess or a lubricant pool 33. The opening 30 in this second version, although differing in contour from the opening 20 as stated earlier, can stand comparison with the opening 20 in their expected function. With the opening 30, the straight lengths 43 lying in parallel and in opposition to each other is spaced out to allow the roller 10 to pass diametrically between them across the cage plate 4. Moreover, the straight edges 44 near the end 42 of the major axis are spaced away at the interval less than the diametral dimension of the roller 10 so as make it possible to bear the rolling surface 18 of the roller 10 thereon.

What is claimed is:

1. A linear motion guide unit, comprising;
a pair of guideway members lying movable relatively to one another and having confronting raceway grooves on their sides extending in a lengthwise direction, a plurality of rollers for rolling element arranged in a raceway defined between the raceway grooves to roll through on raceway surfaces on the raceway grooves, and a cage having a flat cage plate extending in the lengthwise direction of the guideway members and retaining therein the rollers at preselected intervals in such geometry that their own axes tilt alternately in opposite direction to one another;
wherein the cage plate has openings to retain the rollers therein arranged to space the respective rollers from each other in the lengthwise direction, the openings each having a contour whose major axis lies in a widthwise direction of the cage plate;
wherein the openings are provided inside with bearing lips to retain axially opposite end surfaces of the rollers, the bearing lips extending inside from an edge around the opening at locations corresponding with diametrically opposite ends of the major axis of the opening, and the bearing lips facing each other and ending into wedged bearing edges deformable elastically;
wherein the bearing edges have bearing slants each adapted to conform to the end surface of the roller to bear the roller thereon; and
wherein the bearing slants are in diametrically symmetric relation to each other at the ends of the major axis of the opening, wherein the bearing lips extending from the locations corresponding with the ends of the major axis towards a center of the opening are less in thickness than a thickness of the cage plate to provide recesses to reserve lubricant on the bearing lips at the locations corresponding with the ends of the major axis, and an overall length of the bearing lips lies in a space defined between opposite flat major surfaces of the cage plate.

2. A linear motion guide unit constructed as defined in claim 1, wherein the rollers are born on the bearing lips inside the respective openings and arranged in such geometry that their own rotating axes tilt alternately in opposite directions at 90 degrees relatively to one another.

3. A linear motion guide unit constructed as defined in claim 1, wherein one of the axially opposite end surfaces of the roller is kept in abutment against the bearing slant on the bearing edge of one bearing lip and the rolling surface of the roller adjacent to another end surface of the roller is forced against a rear surface of the another bearing edge of the bearing lip to turn the roller to set the roller up whereby the roller at the rolling surface thereof causes the bearing edge to deform elastically to negotiate or get over the end of the bearing edge to make engagement at the axially opposite end surfaces with the bearing lips to fit snugly into the opening.

4. A linear motion guide unit constructed as defined in claim 1, wherein a mechanism to prevent the cage from getting out of place or straying out of a desired relative location to the guideway members is constituted with a rack-and-pinion mechanism composed of a pinion installed for rotation in a pinion holder which fits into a window cut in middle of the cage plate, and elongated racks secured lying in raceway grooves cut lengthwise in the guideway members, one to each guideway member.

5. A linear motion guide unit constructed as defined in claim 1, wherein the bearing edges on the bearing lips are beveled to provide the bearing slants each of which conforms to the end surface of the roller retained tilting at 45 degrees with respect to the flat major surfaces of the cage plate, and wherein the bearing slants are at the locations corresponding to the ends of the major axis of the opening in geometry facing with each other.

6. A linear motion guide unit constructed as defined in claim 1, wherein side walls defining the opening in the cage plate when viewed on a plane taken along minor axis of the opening is either of surfaces lying perpendicular to the major surfaces of the cage plate or surfaces tilted at a preselected angles relatively to the major surfaces of the cage plate.

7. A linear motion guide unit constructed as defined in claim 1, wherein the opening to retain the roller therein has a contour of ellipse having the major axis lying in the widthwise direction of the cage plate and the minor axis lying in the lengthwise direction of the cage plate, or a contour of polygon having the major axis lying in the widthwise direction of the cage plate and the minor axis lying in the lengthwise direction of the cage plate, and further having straight lengths extending in the middle widthwise of the cage plate in a way lying in parallel and in opposition to each other.

8. A linear motion guide unit constructed as defined in claim 1, wherein the opening to fit over the roller is defined with the straight lengths extending in the middle widthwise of the cage plate to allow the roller to pass diametrically between them across the cage plate, and edges starting at the straight lengths and converging on the end of the major axis to make an interval between straight lengths less to prevent the roller born on the bearing lips from falling away through the opening.

* * * * *